United States Patent [19]

Kurnit

[11] 4,194,170

[45] Mar. 18, 1980

[54] SHIFTING OF INFRARED RADIATION USING ROTATIONAL RAMAN RESONANCES IN DIATOMIC MOLECULAR GASES

[75] Inventor: Norman A. Kurnit, Santa Fe, N. Mex.

[73] Assignee: The United States of America as represented by the United States Department of Energy, Washington, D.C.

[21] Appl. No.: 960,409

[22] Filed: Nov. 13, 1978

Related U.S. Application Data

[63] Continuation-in-part of Ser. No. 802,400, Jun. 1, 1977, abandoned.

[51] Int. Cl.$^2$ ............................................. H01S 3/22
[52] U.S. Cl. ........................ 331/94.5 N; 331/94.5 G; 307/424
[58] Field of Search ................... 331/94.5 N, 94.5 G; 350/96.3; 307/88.3

[56] References Cited

U.S. PATENT DOCUMENTS

| | | | |
|---|---|---|---|
| 3,655,993 | 4/1972 | Wolff | 350/96.3 |
| 3,705,992 | 12/1972 | Ippen et al. | 331/94.5 N |

OTHER PUBLICATIONS

Byer et al., 16 μm Generation by CO$_2$-Pumped Rotational Raman Scattering in H$_2$ Optics Letts. vol. 3, No. 4 (Oct. 1978) pp. 144-146.

Rabinowitz et al., Stimulated Rotational Ramon Scattering From Para-H$_2$ Pumped by a CO$_2$ TEA Laser, Optics Letts., vol. 3, No. 4 (Oct. 1978) pp. 147-148.

Rabinowitz et al., Waveguide H$_2$ Raman Laser, Applied Optics, vol. 15, No. 9 (Sept. 1976) pp. 2005-2006.

CRC Handbook of Lasers, Pressley, Ed. The Chemical Rubber Co., Cleveland Ohio (1971) p. 528.

Primary Examiner—William L. Sikes
Attorney, Agent, or Firm—R. V. Lupo; William W. Cochran II

[57] ABSTRACT

A device for shifting the frequency of infrared radiation from a CO$_2$ laser by stimulated Raman scattering in either H$_2$ or D$_2$. The device of the preferred embodiment comprises an H$_2$ Raman laser having dichroic mirrors which are reflective for 16 μm radiation and transmittive for 10 μm, disposed at opposite ends of an interaction cell. The interaction cell contains a diatomic molecular gas, e.g., H$_2$, D$_2$, T$_2$, HD, HT, DT and a capillary waveguide disposed within the cell. A liquid nitrogen jacket is provided around the capillary waveguide for the purpose of cooling. In another embodiment the input CO$_2$ radiation is circularly polarized using a Fresnel rhomb λ/4 plate and applied to an interaction cell of much longer length for single pass operation.

40 Claims, 3 Drawing Figures

SHIFTING OF INFRARED RADIATION USING ROTATIONAL RAMAN RESONANCES IN DIATOMIC MOLECULAR GASES

CROSS REFERENCE TO RELATED APPLICATIONS

This application is a continuation-in-part of copending application Ser. No. 802,400 filed June 1, 1977, now abandoned, by Norman A. Kurnit entitled "Shifting of $CO_2$ Laser Radiation Using Rotational Raman Resonances in $H_2$ and $D_s$".

BACKGROUND OF THE INVENTION

The present invention pertains generally to infrared lasers and more particularly to stimulated Raman scattering utilizing rotational transitions in a diatomic molecular gas.

Various methods have been disclosed for shifting frequencies of conventional laser outputs in the IR spectrum. These methods have included four-wave mixing as disclosed in commonly assigned application Ser. No. 787,415 filed Apr. 14, 1977 by Richard F. Begley et al. entitled "Resonantly Enhanced Four-Wave Mixing," now U.S. Pat. No. 4,095,121 issued June 13, 1978 and Raman scattering as disclosed in commonly assigned application Ser. No. 466,583 filed May 2, 1974 by C. D. Cantrell et al. entitled "Infrared Laser System," now U.S. Pat. No. 4,061,921 issued Dec. 6, 1977 of which the present invention comprises an improvement.

In each of these systems and other previous systems for IR frequency shifting to a broad range of frequencies, simplicity and overall efficiency are important factors for economic utilization of the device. By minimizing the steps required for frequency shifting, such as the elimination of the Raman spin flip laser as set forth in the above disclosed application Ser. No. 466,583, the device can be simplified to reduce problems inherent in more complex systems.

Since the stimulated Raman effect can be produced in a single step with high conversion efficiencies, Raman shifting of a $CO_2$ laser output provides high overall efficiencies because of the high efficiencies and well developed technology of $CO_2$ lasers. However, Raman gain in gaseous media such as $H_2$, $D_2$, $T_2$, HD, HT, or DT in the infrared requires threshold powers for stimulated Raman scattering which are near the breakdown threshold of the diatomic molecular gas for single pass focused geometry, such as suggested by Robert L. Byer, in an article entitled "A 16 $\mu m$ Source for Laser Isotope Enrichment" published in IEEE J. of Quantum Electronics, Vol. QE-12-732-733, November 1976.

SUMMARY OF THE INVENTION

The present invention overcomes the disadvantages and limitations of the prior art by providing an improved device for shifting infrared radiation using rotational Raman resonances in a diatomic molecular gas. The invention utilizes a capillary waveguide in combination with a resonator to considerably reduce threshold intensities required by single pass focused geometry. The capillary waveguide also allows use of short focal length lenses for providing maximum intensity without causing damage to the dichroic mirrors or interaction cell windows. Since the resonator allows lower gain parameters due to multiple oscillations in the lasing cavity, the size of the device is reduced substantially and operation is assured within the limitations of the breakdown threshold of the gaseous medium. Further, the invention employs circular polarization to increase Raman gain and restrahl reflectivity to reduce waveguide losses.

In addition, by modelocking the $CO_2$ laser and matching the lengths of the $CO_2$ laser cavity and the Raman laser cavity, high peak gain is achieved on synchronously generated Raman Stokes pulses. Modelocking the $CO_2$ laser and matching cavity lengths also allows double-pass of the $CO_2$ laser radiation without having an overlap of high peak power pulses within the waveguide.

It is therefore an object of the present invention to provide a device for shifting across a broad range of frequencies in the infrared spectrum.

It is also an object of the present invention to provide a device for shifting across a broad range of IR frequencies which is simple in operation.

Another object of the present invention is to provide a device for IR frequency shifting across a broad range of frequencies which is highly efficient in operation.

Another object of the present invention is to provide a device for stimulated Raman scattering in a diatomic molecular gas.

Other objects and further scope of applicability of the present invention will become apparent from the detailed description given hereinafter. A detailed description indicating the preferred embodiment of the invention is given only by way of illustration since various changes and modifications within the spirit and scope of the invention will become apparent to those skilled in the art from this detailed description. The foregoing Abstract of the Disclosure is for the purpose of providing a nonlegal brief statement to serve as a searching and scanning tool for scientists, engineers and researchers and it is not intended to limit the scope of the invention as disclosed herein nor is it intended to be used in interpreting or any way limiting the scope or fair meaning of the appended claims.

DETAILED DESCRIPTION OF THE PREFERRED EMBODIMENT OF THE INVENTION

Figure 1:
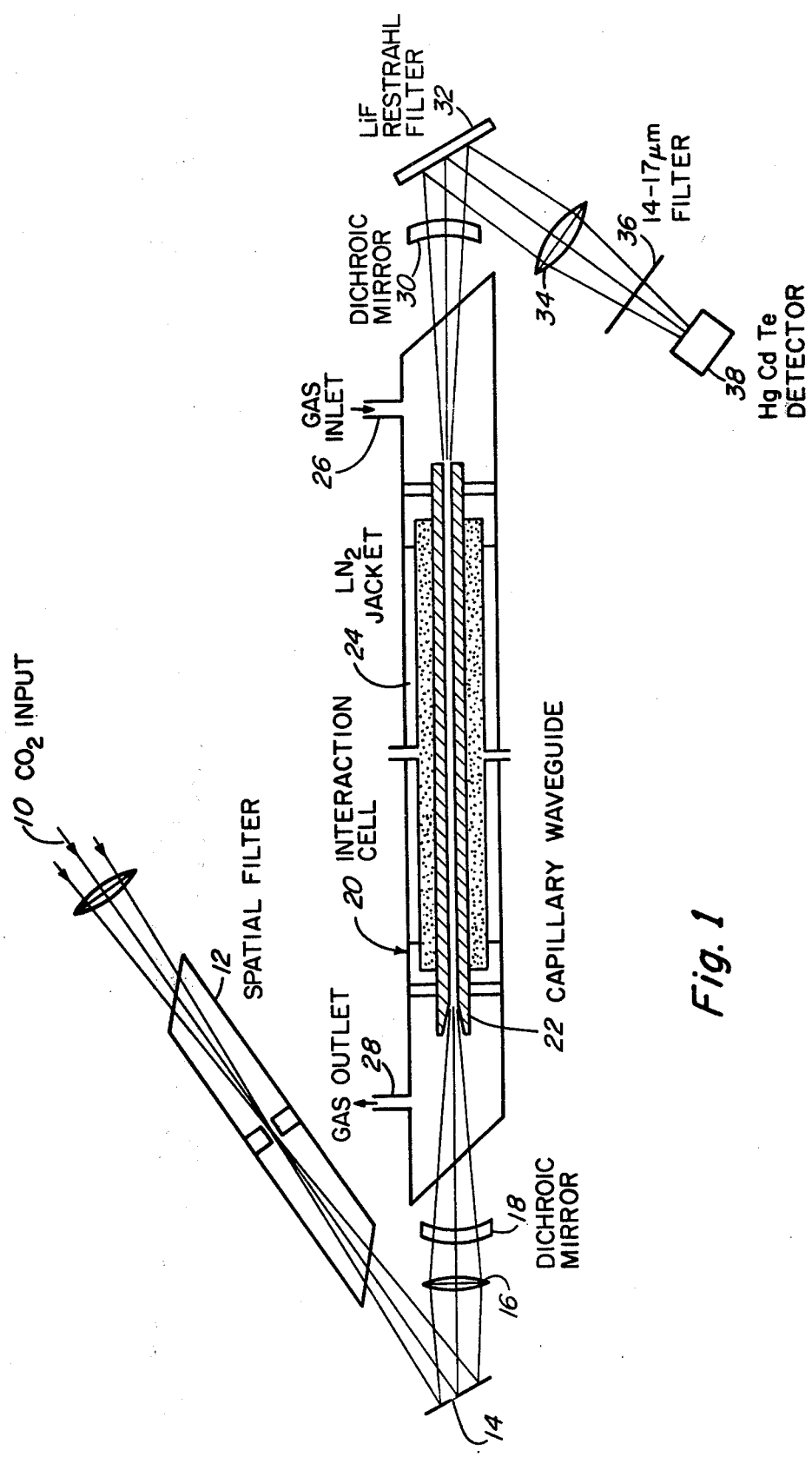
FIG. 1 discloses the Raman laser of the preferred embodiment of the invention.

FIG. 1 discloses the Raman laser which comprises the preferred embodiment of the invention. $CO_2$ input radiation 10 is applied to spatial filter 12 to eliminate "hot spots" from the spatial intensity of the beam which prevents possible damage to various mirrors and windows of the Raman oscillator. The spatially filtered beam is reflected by mirror 14 and focused by lens 16 through dichroic mirror 18 into the interaction cell 20. Dichroic mirrors 18 and 30 function to transmit the 10 $\mu m$ infrared radiation produced by the $CO_2$ radiation source and reflect nearly all of the frequency shifted radiation generated within the interaction cell 20 produced by stimulated Raman scattering from rotational transitions of a diatomic molecular gas such as $H_2$, $D_2$, $T_2$, HD, HT, DT. Alternatively, mirror 30 can be made highly reflecting at the $CO_2$ wavelength as well so as to double pass the $CO_2$ radiation through the interaction cell. By modelocking the $CO_2$ laser and matching $CO_2$ laser cavity length and the length between the dichroic mirrors, overlap of high intensity $CO_2$ pulses during double pass operation is avoided, and high gain is provided for synchronously generated Raman Stokes pulses. A capillary waveguide 22 is positioned within the interaction cell 20 such that the diatomic molecular gas flowing through the interaction cell 20 via gas inlet 26 and gas outlet 28 is contained within the capillary waveguide 22. A liquid nitrogen jacket 24 surrounds the primary length of the capillary waveguide 22 and functions to cryogenically cool the diatomic molecular gas to maintain ground state population. The capillary waveguide 22 is tapered at one end to minimize ablation or sputtering of the waveguide material upon the application of infrared radiation from the infrared $CO_2$ radiation source. The capillary 22 is fabricated from pyrex or quartz or of either $MgO$ or $Al_2O_3$ to reduce losses as a result of restrahl reflectivity of these materials at desired IR frequencies. A LiF restrahl filter 32 reflects the frequency shifted radiation which is focused by lens 34 upon a 14 μm to 17 μm filter 36. A HgCdTe or other infrared type detector 38 is utilized to detect the presence of desired spectral lines.

In operation, the device of FIG. 1 functions as a Raman oscillator in which the capillary waveguide 22 increases the focal interaction length (L) by the length of the capillary 22. Stimulated Raman scattering is initiated by rotational transitions of the diatomic molecular gas. Frequency shifted radiation produced by Raman scattering oscillates within the optical cavity of the Raman laser defined by dichroic mirrors 18 and 30, and a portion of this energy is emitted from the oscillating cavity via partially reflective dichroic mirror 30. The focal interaction length is therefore increased by the number of times the frequency shifted radiation traverses the length of the capillary waveguide. This large increase in the focal interaction length (L) increases the exponential gain factor ($e^{gL}$) by an amount sufficient to overcome losses and produce a frequency shifted output signal.

Diatomic molecular gases suitable for operation in such a device comprises $H_2$, $D_2$, $T_2$, HD, HT, DT. Stimulated Raman scattering from rotational transitions of $H_2$ give coverage throughout the range 13.5 to 18 μm using the 354 cm$^{-1}$ $S_{oo}(0)$ transition and from 20 to 30 μm using the 587 cm$^{-1}$ $S_{oo}(1)$ transition. Rotational transitions of $D_2$ give coverage from 11 μm to 14 μm using the 179 cm$^{-1}$ $S_{oo}(0)$ transition, 12.6 μm to 16.9 μm using the 298 cm$^{-1}$ $S_{oo}(1)$ transition, and 14.7 μm to 21 μm using the 415 cm$^{-1}$ $S_{oo}(2)$ transition. With a tunable high pressure $CO_2$ laser utilizing either $D_2$ or $H_2$, any wavelength in the range 11 μm to 30 μm can be generated by Raman lasing in the device of the preferred embodiment. With an atmospheric pressure $CO_2$ laser, tunability is limited to a few GHz near line center of transitions spaced by ~25 GHz to ~70 GHz. However, by use of isotopic variants of $CO_2$ or of rotational transitions of the other hydrogen isotopes ($T_2$, HD, HT, DT), as disclosed for example by G. Herzberg, "Sprectra of Diatomic Molecules," Van Nostrand, 1950, pp. 530-533, essentially continuous coverage of this range can also be achieved. Other molecular gas lasers such as $N_2O$ or $CS_2$ can be used to provide other input radiation frequencies.

Figure 2:
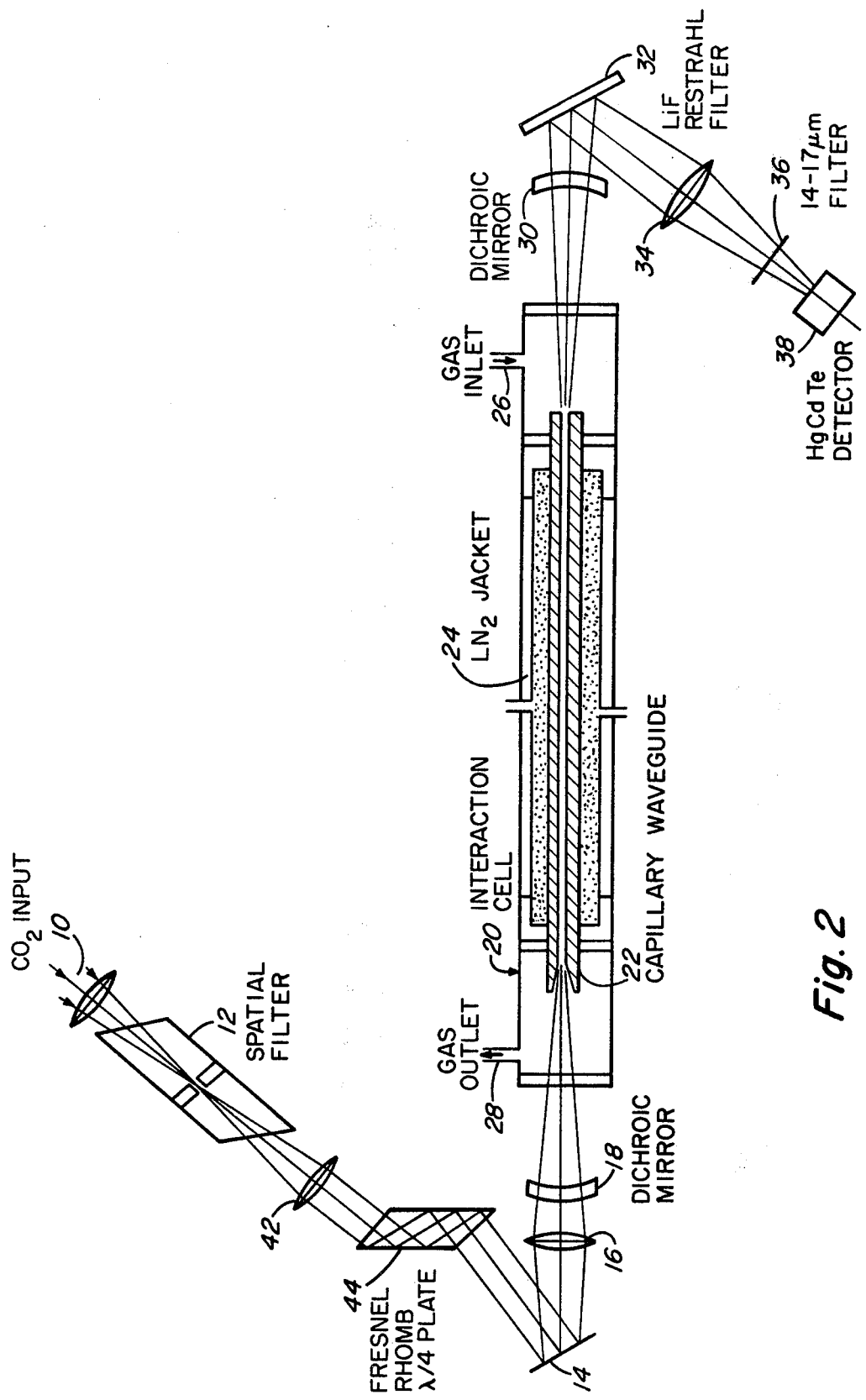
FIG. 2 discloses a variation of the preferred embodiment of FIG. 1.

FIG. 2 discloses a variation of the preferred embodiment of FIG. 1 in which a Fresnel rhomb λ/4 plate 44 is introduced between the spatial filter 12 and focusing optics 16. The Fresnel rhomb λ/4 plate 44 functions to circularly polarize the infrared radiation 10 from the infrared $CO_2$ radiation source. When circularly polarized radiation is applied to the interaction cell 20, it increases Raman gain and reduces anti-Stokes generation in the diatomic molecular gas.

Figure 3:
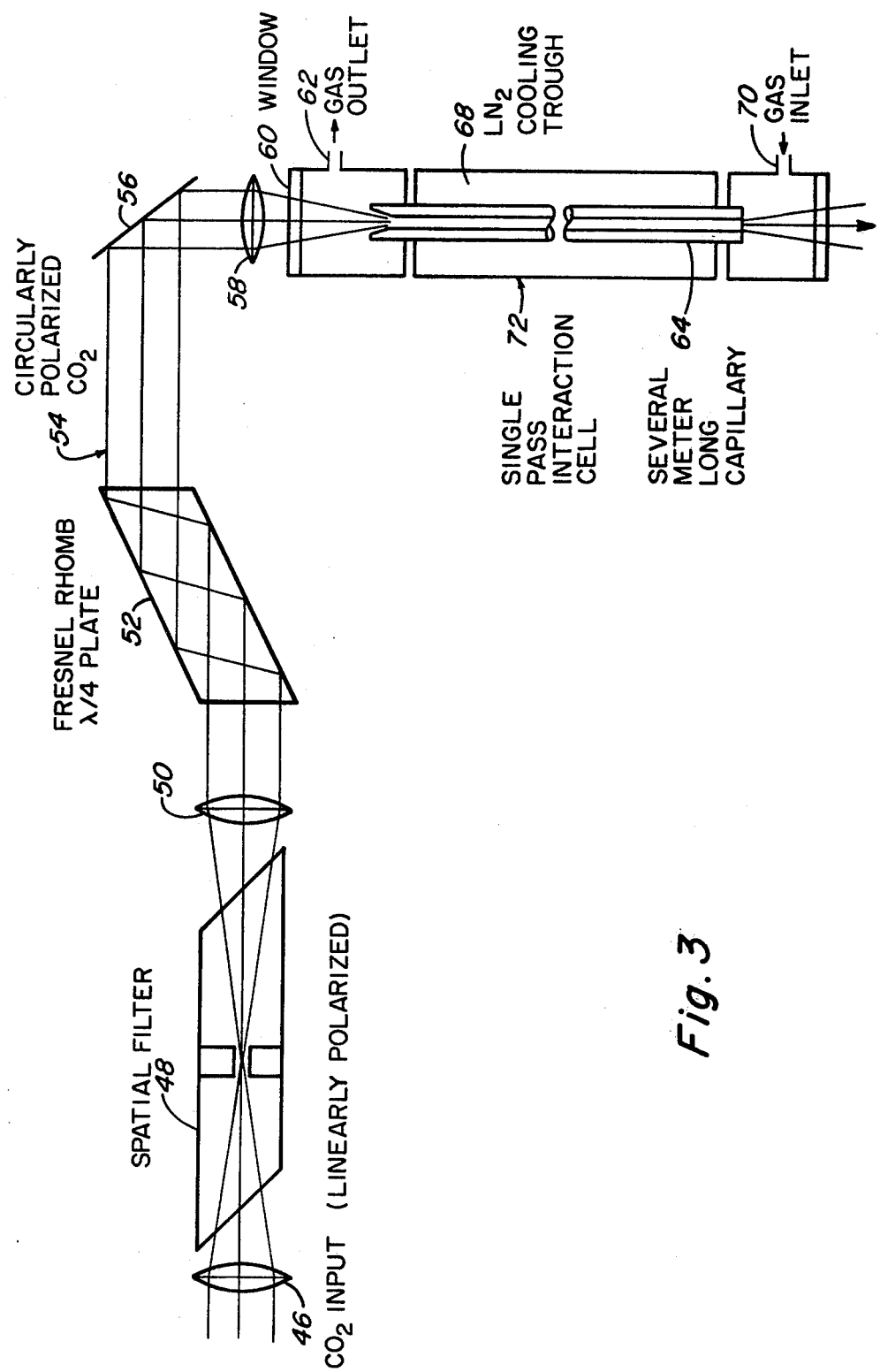
FIG. 3 discloses an alternative preferred embodiment.

FIG. 3 discloses an alternative embodiment in which $CO_2$ IR radiation 46 is circularly polarized by Fresnel rhomb λ/4 plate 52 and applied to a single pass interaction cell 72. The single pass interaction cell comprises a several meter long capillary 64 positioned within the interaction cell 72 which contains the desired diatomic molecular gas. The capillary is cooled by a liquid nitrogen cooling jacket or trough 68 to maintain ground state population in the diatomic molecular gas. A flat window 60 is utilized rather than a Brewster angle window because of the circular polarization of the IR radiation. The use of circularly polarized light in the embodiment of FIG. 3 is especially necessary to reduce competition from anti-Stokes generation. In the embodiment of FIG. 3, interaction length is provided by extending the length of the capillary 64 rather than by multiple passes in the Raman oscillator as accomplished in the devices of FIGS. 1 and 2. Modelocking of the $CO_2$ laser in the embodiment of FIG. 3 provides high peak intensity $CO_2$ pulses for increased Raman gain.

The present invention therefore provides a means for increasing the exponential gain factor ($e^{gL}$) sufficiently to overcome losses in the molecular gas and produce stimulated Raman scattered frequency shifted radiation from rotational transitions. The embodiments of the present invention have the advantage of simplicity and single step operation for generating a wide range of frequencies in the infrared spectral region.

Obviously many modification and variations of the present invention are possible in light of the above teachings. For example, multiple Stokes frequencies can be generated by using a multiple frequency $CO_2$ beam as the source of input radiation. It is therefore to be understood that within the scope of the appended claims the invention may be practiced otherwise than as described.

I claim:

1. A Raman laser for frequency shifting infrared radiation comprising:
   an infrared radiation source for producing said infrared radiation;
   an interaction cell containing a diatomic molecular gas;
   a restrahl reflective capillary waveguide disposed within said interaction cell;
   dichroic means disposed at each end of said interaction cell for primarily reflecting frequency shifted radiation and primarily transmitting said infrared radiation from said infrared radiation source;
   whereby said capillary waveguide increased focal interaction length between said infrared radiation from said infrared radiation source and said diatomic molecular gas to overcome losses and produce stimulated Raman scattered frequency shifted radiation from rotational transitions in said diatomic molecular gas.

2. The laser of claim 1 further comprising:
   a spatial filter aligned with said infrared radiation source; and
   means for focusing said infrared radiation from said infrared radiation source, said means for focusing having a short focal length to maximize radiation intensity within said capillary waveguide without causing window damage to said dichroic means.

3. The laser of claim 1 wherein said capillary comprises a MgO capillary having restrahl reflectivity to reduce losses.

4. The laser of claim 1 wherein said capillary comprises an $Al_2O_3$ capillary having restrahl reflectivity to reduce losses.

5. The laser of claim 1 wherein said capillary comprises a BeO capillary having restrahl reflectivity to reduce losses.

6. The laser of claim 1 further comprising means for cryogenically cooling said capillary to maintain ground state population of said diatomic molecular gas.

7. The laser of claim 1 wherein said infrared radiation source comprises a variable frequency $CO_2$ laser.

8. The laser of claim 2 wherein said capillary comprises a MgO capillary having restrahl reflectivity to reduce losses.

9. The laser of claim 2 wherein said capillary comprises an $Al_2O_3$ capillary having restrahl reflectivity to reduce losses.

10. The laser of claim 2 wherein said capillary comprises a BeO capillary having restrahl reflectivity to reduce losses.

11. The laser of claim 2 further comprising means for cryogenically cooling said capillary to maintain ground state population of said diatomic molecular gas.

12. The laser of claim 2 wherein said infrared radiation source comprises a variable frequency $CO_2$ laser.

13. The laser of claim 1 wherein said diatomic molecule comprises $H_2$.

14. The laser of claim 1 werein said diatomic molecule comprises $D_2$.

15. The laser of claim 1 wherein said diatomic molecule comprises $T_2$.

16. The laser of claim 1 wherein said diatomic molecule comprises HD.

17. The laser of claim 1 wherein said diatomic molecule comprises HT.

18. The laser of claim 1 wherein said diatomic molecule comprises DT.

19. The laser of claim 1 wherein said infrared radiation source comprises a multiple frequency infrared radiation source.

20. The laser of claim 1 wherein said infrared radiation source comprises a modelocked infrared radiation source.

21. The laser of claim 1 further comprising means for circularly polarizing said infrared radiation to increase Raman gain and reduce anti-Stokes generation within said capillary waveguide.

22. A device for producing stimulated Raman scattering from rotational transitions in a diatomic molecular gas to frequency shift infrared radiation comprising:
an infrared source for producing said infrared radiation;
an interaction cell containing said diatomic molecular gas;
restrahl reflective capillary waveguide means disposed within said interaction cell to increase focal interaction length and reduce losses;
means for circularly polarizing said infrared radiation to increase Raman gain and reduce anti-Stokes generation within said capillary waveguide;
whereby said focal interaction length is increased sufficiently within said capillary waveguide to overcome losses and produce stimulated Raman scattered frequency shifted radiation from rotational transitions in said molecular gas in a single pass of said infrared radiation through said capillary waveguide.

23. The device of claim 22 further comprising means for focusing said infrared radiation at one end of said capillary waveguide at an intensity sufficient to produce frequency shifted infrared radiation.

24. The device of claim 22 further comprising means for cryogenically cooling said capillary waveguide means to maintain ground state population in said diatomic molecular gas.

25. The device of claim 23 further comprising means for cryogenically cooling said capillary waveguide means to maintain ground state population in said diatomic molecular gas.

26. The device of claim 22 wherein said capillary waveguide means comprises a MgO capillary having restrahl reflectivity to reduce losses.

27. The device of claim 22 wherein said capillary waveguide means comprises an $Al_2O_3$ capillary having restrahl reflectivity to reduce losses.

28. The device of claim 22 wherein said capillary waveguide means comprises a BeO capillary having restrahl reflectivity to reduce losses.

29. The device of claim 22 further comprising spatial filter means for eliminating hotspots in the spatial intensity of said infrared radiation.

30. The device of claim 22 wherein said diatomic molecular gas comprises $H_2$.

31. The device of claim 22 wherein said diatomic molecular gas comprises $D_2$.

32. The device of claim 22 wherein said diatomic molecular gas comprises $T_2$.

33. The device of claim 22 wherein said diatomic molecular gas comprises HD.

34. The device of claim 22 wherein said diatomic molecular gas comprises HT.

35. The device of claim 22 wherein said diatomic molecular gas comprises DT.

36. The device of claim 22 wherein said infrared source comprises a tunable $CO_2$ laser.

37. The device of claim 22 wherein said infrared source comprises a $N_2O$ laser.

38. The device of claim 22 wherein said infrared source comprises a $CS_2$ laser.

39. The device of claim 22 wherein said infrared source comprises a multiple frequency $CO_2$ laser.

40. The device of claim 22 wherein said infrared source comprises a multiple frequency infrared radiation source.

* * * * *